US012291626B2

(12) United States Patent
Gavard-Lonchay et al.

(10) Patent No.: US 12,291,626 B2
(45) Date of Patent: May 6, 2025

(54) RUBBER COMPOSITION BASED ON AT LEAST ONE FUNCTIONALIZED ELASTOMER COMPRISING POLAR FUNCTIONAL GROUPS AND A SPECIFIC PHENOLIC COMPOUND

(71) Applicant: COMPAGNIE GENERALE DES ETABLISSEMENTS MICHELIN, Clermont-Ferrand (FR)

(72) Inventors: Odile Gavard-Lonchay, Clermont-Ferrand (FR); Anne-Lise Thuilliez, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 912 days.

(21) Appl. No.: 17/414,204

(22) PCT Filed: Dec. 11, 2019

(86) PCT No.: PCT/FR2019/053019
§ 371 (c)(1),
(2) Date: Jun. 15, 2021

(87) PCT Pub. No.: WO2020/128234
PCT Pub. Date: Jun. 25, 2020

(65) Prior Publication Data
US 2022/0025163 A1 Jan. 27, 2022

(30) Foreign Application Priority Data

Dec. 17, 2018 (FR) ........................................ 1873024
Jan. 31, 2019 (FR) ........................................ 1900923

(51) Int. Cl.
| | |
|---|---|
| *C08L 15/00* | (2006.01) |
| *B60C 1/00* | (2006.01) |
| *C08J 5/04* | (2006.01) |
| *C08K 3/04* | (2006.01) |
| *C08K 5/07* | (2006.01) |
| *C08K 5/13* | (2006.01) |
| *C08K 5/134* | (2006.01) |
| *C08K 5/18* | (2006.01) |
| *C08K 13/02* | (2006.01) |

(52) U.S. Cl.
CPC ............ *C08L 15/00* (2013.01); *B60C 1/0016* (2013.01); *B60C 1/0041* (2013.01); *C08J 5/041* (2013.01); *C08K 13/02* (2013.01); *B60C 2001/0066* (2013.01); *C08J 2315/00* (2013.01); *C08K 3/04* (2013.01); *C08K 5/07* (2013.01); *C08K 5/13* (2013.01); *C08K 5/134* (2013.01); *C08K 5/18* (2013.01)

(58) Field of Classification Search
CPC ..... C08L 15/00; B60C 1/0016; B60C 1/0041; B60C 2001/0066; C08J 5/041; C08J 2315/00; C08K 13/02; C08K 3/04; C08K 5/07; C08K 5/13; C08K 5/134; C08K 5/18

See application file for complete search history.

(56) References Cited

U.S. PATENT DOCUMENTS

| | | |
|---|---|---|
| 5,576,080 A | 11/1996 | Sugimoto et al. |
| 6,387,524 B1 | 5/2002 | Finefrock |
| 6,903,165 B2 | 6/2005 | Yabui et al. |
| 7,199,175 B2 | 4/2007 | Vasseur |
| 7,250,463 B2 | 7/2007 | Durel et al. |
| 7,900,667 B2 | 3/2011 | Vasseur |
| 10,544,298 B2 | 1/2020 | Doisneau et al. |
| 10,604,613 B2 | 3/2020 | Doisneau et al. |
| 10,647,848 B2 | 5/2020 | Thuilliez et al. |
| 11,091,580 B2 | 8/2021 | Doisneau et al. |
| 2003/0212185 A1 | 11/2003 | Vasseur |
| 2005/0004297 A1 | 1/2005 | Durel et al. |
| 2006/0151084 A1 | 7/2006 | Serra |
| 2007/0112120 A1 | 5/2007 | Vasseur |
| 2011/0098404 A1 | 4/2011 | Kwag et al. |
| 2012/0103487 A1 | 5/2012 | Majumdar |
| 2013/0068336 A1 | 3/2013 | Kanbe et al. |
| 2015/0114539 A1* | 4/2015 | Fudemoto ............... C08L 77/00 152/537 |
| 2015/0368444 A1 | 12/2015 | Fleury et al. |
| 2016/0121654 A1 | 5/2016 | Shibata |
| 2017/0073509 A1* | 3/2017 | Koda ..................... C08L 91/06 |
| 2017/0362370 A1 | 12/2017 | Doisneau et al. |
| 2018/0326786 A1 | 11/2018 | Thuilliez et al. |
| 2018/0362754 A1 | 12/2018 | Thuilliez et al. |
| 2018/0371141 A1 | 12/2018 | Thuilliez et al. |
| 2020/0031980 A1 | 1/2020 | Doisneau et al. |
| 2021/0087366 A1 | 3/2021 | Thuilliez et al. |
| 2021/0347966 A1 | 11/2021 | Gavard-Lonchay et al. |

(Continued)

FOREIGN PATENT DOCUMENTS

| | | |
|---|---|---|
| CN | 102463846 A | 5/2012 |
| CN | 104356457 A | 2/2015 |

(Continued)

OTHER PUBLICATIONS

English Machine Translation of JP 2005-002182. (Year: 2005).*

(Continued)

*Primary Examiner* — Angela C Scott
(74) *Attorney, Agent, or Firm* — VENABLE LLP

(57) ABSTRACT

The invention relates to a rubber composition based on at least one functionalized elastomer comprising polar functional groups, a reinforcing filler and a specific phenolic compound.

15 Claims, No Drawings

(56) References Cited

U.S. PATENT DOCUMENTS

| | | |
|---|---|---|
| 2021/0380784 A1 | 12/2021 | Thuilliez et al. |
| 2022/0064415 A1 | 3/2022 | Gavard-Lonchay et al. |
| 2023/0077022 A1 | 3/2023 | Thuilliez et al. |

FOREIGN PATENT DOCUMENTS

| | | | |
|---|---|---|---|
| EP | 0247580 | A2 | 12/1987 |
| EP | 0763564 | A2 | 3/1997 |
| EP | 1403287 | A1 | 3/2004 |
| EP | 2639055 | A1 | 9/2013 |
| EP | 3006206 | A1 | 4/2016 |
| JP | 11-220258 | A | 8/1999 |
| JP | 2000-160479 | A | 6/2000 |
| JP | 2004-525022 | A | 8/2004 |
| JP | 2005002182 | A * | 1/2005 |
| JP | 2010084112 | A * | 4/2010 |
| JP | 2012-57104 | A | 3/2012 |
| JP | 2012-207088 | A | 10/2012 |
| JP | 2012-229282 | A | 11/2012 |
| JP | 2014-129509 | A | 7/2014 |
| JP | 2017-2141 | A | 1/2017 |
| JP | 2017-179118 | A | 10/2017 |
| KR | 10-2014-0126489 | A | 10/2014 |
| WO | 97/36724 | A2 | 10/1997 |
| WO | 99/16600 | A1 | 4/1999 |
| WO | 02/10269 | A2 | 2/2002 |
| WO | 02/078983 | A1 | 10/2002 |
| WO | 03/16387 | A1 | 2/2003 |
| WO | 2014/095586 | A1 | 6/2014 |
| WO | 2016/116468 | A1 | 7/2016 |
| WO | 2017/081387 | A1 | 5/2017 |
| WO | 2017/081388 | A1 | 5/2017 |
| WO | 2017/103403 | A1 | 6/2017 |
| WO | 2017/103404 | A1 | 6/2017 |
| WO | 2017/103406 | A1 | 6/2017 |

OTHER PUBLICATIONS

English Machine Translation of JP 2010-084112. (Year: 2010).*
International Search Report dated Feb. 20, 2020, in corresponding PCT/FR2019/053019 (6 pages).
Thomson Scientific, London GB; vol. 2015, No. 33, AN 2015-22497F, retrieved from: Database WPI (online) XP 002796186, 4 pages.
M.M. Jacobi, et al., "Study of the Epoxidation of Polydiene Rubbers II.", KGK Kautschuk Gummi Kunststoffe 57, Jahrgang, Nr. Mar. 2004.
J.J. Yu, et al., "Ultraviolet-Initiated Photografting of Glycidyl Methacrylate onto Styrene-Butadiene Rubber", J. Appl. Polymer Sci., vol. 73, 1733-1739 (1999).
N.M. Ahmad, et al., "Chain Transfer to Polymer in Free-Radical Solution Polymerization of n-Butyl Acrylate Studied by NMR Spectroscopy", Macromolecules 1998, 31, 2822-2827.

* cited by examiner

RUBBER COMPOSITION BASED ON AT LEAST ONE FUNCTIONALIZED ELASTOMER COMPRISING POLAR FUNCTIONAL GROUPS AND A SPECIFIC PHENOLIC COMPOUND

TECHNICAL FIELD OF THE INVENTION

The present invention relates to rubber compositions based on at least one elastomer comprising polar functional groups, and also to composites, finished or semi-finished articles and tyres comprising these compositions.

PRIOR ART

It is known, and has been common practice for a great many years, to use, in tyres, rubber compositions whose elastomer matrix is crosslinked with sulfur, this crosslinking then being known as vulcanization. The conventional vulcanization system combines molecular sulfur and at least one vulcanization accelerator. However, it is known that such a system may be detrimental to the processing of the composition before curing by the scorching phenomenon. It will be recalled that "scorching" rapidly leads, during the preparation of rubber compositions, to premature vulcanization ("scorching"), to very high viscosities in the raw state, and finally to rubber compositions that are difficult to work and to process industrially.

Consequently, vulcanization systems have been improved over the years, in combination with the processes for preparing rubber compositions, in order to control the above-mentioned drawbacks. Thus, the compositions are often complex and comprise, in addition to molecular sulfur or a molecular sulfur donor, vulcanization accelerators, activators and optionally vulcanization retarders.

Among the various elements of a tyre, the reinforcing plies, which include, in a known manner, a rubber mix and reinforcing cords, for example metal cords, generally require specific formulations for the rubber mix, notably the need for a high content of sulfur and of zinc oxide, a small amount of stearic acid, the presence of cobalt salt, and the use of a long lag phase accelerator in order, in particular, to ensure the adhesion function. However, these vulcanization systems with a high sulfur content constitute a major constraint during the manufacture of semi-finished articles, in particular in order to avoid premature crosslinking.

Studies were thus conducted to develop alternative crosslinking systems to vulcanization, while at the same time simplifying the compositions and their preparation. Thus, patent application WO 2014/095586 presents a rubber composition comprising an epoxidized elastomer and a crosslinking system comprising a polycarboxylic acid and an imidazole. However, said document does not address the problem of adhesion.

WO 2017/081387 and WO 2017/081388 present a rubber composition and a composite based on a polymer matrix including a functional diene polymer. This functional diene polymer bears at least one aromatic group substituted with at least two vicinal hydroxyl functions. The crosslinking of the rubber composition is performed with a vulcanization system or a system based on one or more peroxide compounds. Good adhesion properties of the rubber composition to the metal are obtained, but require the use of a grafted polymer.

On continuing its studies, the Applicant has now found that particular crosslinkable compositions can be prepared in a simplified manner, relative to the compositions of the prior art, and that these compositions can have improved adhesion properties.

DETAILED DESCRIPTION OF THE INVENTION

The invention, which is described in greater detail below, relates to at least one of the embodiments listed in the following points:

1. A rubber composition based on at least one functionalized elastomer comprising polar functional groups, a reinforcing filler and a phenolic compound of general formula (I)

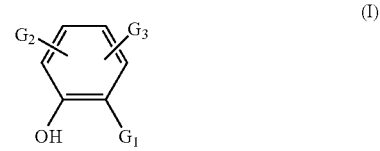

in which:
G$_1$ represents a hydroxyl, carboxyl or alkoxy group or a hydrogen atom;
G$_2$ represents a hydroxyl group or a hydrogen atom;
G$_3$ represents a hydrogen atom or a group chosen from the following groups: hydroxyl, carboxyl, hydrogenocarbonyl, alkyl, carboxylalkyl, carboxylalkenyl, carbonylalkyl, aryl, aryloxy, arylthioxy, arylcarbonyl, amino, aminoalkyl;
at least one of the substituents G$_1$ to G$_3$ comprises an oxygen atom;
said rubber composition not simultaneously comprising an alkyl-imidazole and a polycarboxylic acid of general formula (P1):

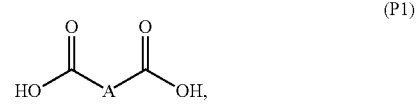

A representing a covalent bond or a hydrocarbon-based group including at least 1 carbon atom, which is optionally substituted and optionally interrupted with one or more heteroatoms.

2. A rubber composition according to the preceding embodiment, in which G$_3$ represents a hydrogen atom or a group chosen from the following groups: hydroxyl, carboxyl, carboxylalkyl, aryl, aryloxy, arylthioxy, arylcarbonyl.

3. A composition according to embodiment 1 or 2, in which the phenolic compound of general formula (I) comprises at least one aromatic nucleus bearing at least two hydroxyl functions in the meta position relative to each other, the two positions ortho to at least one of the hydroxyl functions being unsubstituted.

4. A composition according to any one of the preceding embodiments, in which the phenolic compound of general formula (I) bears at least three hydroxyl functions, preferentially in the meta position relative to each other.

5. A composition according to the preceding embodiment, in which the two positions ortho to each hydroxyl function of the phenolic compound of general formula (I) are unsubstituted.

6. A composition according to embodiment 1, in which $G_3$ represents a group chosen from the following groups: aryl, aryloxy, arylthioxy, arylcarbonyl.
7. A composition according to the preceding embodiment, in which at least two aromatic nuclei of the phenolic compound of general formula (I) bear at least two hydroxyl functions in the meta position relative to each other, the two positions ortho to at least one of the hydroxyl functions of at least one aromatic nucleus being unsubstituted.
8. A composition according to the preceding embodiment, in which the two positions ortho to at least one hydroxyl function of each aromatic nucleus of the phenolic compound of general formula (I) are unsubstituted.
9. A composition according to embodiment 1, in which the phenolic compound of general formula (I) is chosen from the group consisting of resorcinol, phloroglucinol, 2,2',4,4'-tetrahydroxydiphenyl sulfide, 2,2',4,4'-tetrahydroxybenzophenone and mixtures of these compounds.
10. A composition according to any one of the preceding embodiments, comprising at least two phenolic compounds of general formula (I), in which, preferentially, at least one of the two phenolic compounds comprises at least two hydroxyl functions.
11. A composition according to any one of the preceding embodiments, also comprising at least one polyaldehyde.
12. A composition according to any one of the preceding embodiments, in which the functionalized elastomer is chosen from the group consisting of functionalized diene elastomers, functionalized olefinic elastomers and mixtures thereof.
13. A composition according to the preceding embodiment, in which the functionalized elastomer is a diene elastomer of the highly unsaturated type, preferentially a diene elastomer chosen from the group consisting of natural rubber (NR), synthetic polyisoprenes (IRs), polybutadienes (BRs), butadiene copolymers, isoprene copolymers and mixtures of these elastomers.
14. A composition according to the preceding embodiment, in which the butadiene copolymers and the isoprene copolymers are chosen from the group consisting of butadiene/styrene copolymers (SBRs), isoprene/butadiene copolymers (BIRs), isoprene/styrene copolymers (SIRs), isoprene/butadiene/styrene copolymers (SBIRs) and mixtures of such copolymers.
15. A composition according to any one of the preceding embodiments, in which the polar functional groups of the functionalized elastomer comprise at least one atom chosen from halogens, oxygen and nitrogen.
16. A composition according to the preceding embodiment, in which the polar functional groups of the functionalized elastomer comprise at least one group chosen from hydroxyl, carbonyl, imine and epoxide groups, preferably chosen from primary aldimine, aldehyde and epoxide groups, preferentially epoxide.
17. A composition according to any one of the preceding embodiments, in which said composition is free of cobalt salts or contains less than 1 phr thereof.
18. A rubber composition according to any one of the preceding embodiments, said composition being free of zinc or of zinc oxide, or else including only a very small amount thereof, preferentially less than 1 phr, preferably less than 0.5 phr, more preferentially less than 0.2 phr.
19. A rubber composition according to any one of the preceding embodiments, in which the reinforcing filler includes carbon black, silica or a mixture of carbon black and silica.
20. A rubber composition according to any one of the preceding embodiments, in which the content of reinforcing filler is between 20 and 200 phr.
21. A composite based on at least one reinforcing element and on a composition according to any one of the preceding embodiments.
22. A composite according to the preceding embodiment, in which the reinforcing element comprises a metallic surface.
23. A composite according to the preceding embodiment, in which the metallic surface of said reinforcing element comprises a metal chosen from the group consisting of iron, copper, zinc, tin, aluminium, cobalt, nickel and alloys including at least one of these metals.
24. A composite according to the preceding embodiment, in which the metal of the metallic surface is iron, copper, tin, zinc or an alloy including at least one of these metals.
25. A composite according to the preceding embodiment, in which the metal of the metallic surface is brass or steel.
26. A finished or semi-finished article comprising a composition according to any one of embodiments 1 to 20 or a composite according to any one of embodiments 21 to 25.
27. A tyre comprising a composition according to any one of embodiments 1 to 20 or a composite according to any one of embodiments 21 to 25.
28. A tyre comprising an internal layer comprising a composition according to one of embodiments 1 to 20 or a composite according to any one of embodiments 21 to 25.

Definitions

The expression "composition based on" should be understood as meaning a composition including the mixture and/or the product of the in situ reaction of the various constituents used, some of these constituents being able to react and/or being intended to react with each other, at least partially, during the various phases of manufacture of the composition; the composition thus possibly being in the totally or partially crosslinked state or in the non-crosslinked state.

For the purposes of the present invention, the expression "part by weight per hundred parts by weight of elastomer" (or phr) should be understood as meaning the part by mass per hundred parts by mass of elastomer.

In the present text, unless expressly indicated otherwise, all the percentages (%) indicated are mass percentages (%).

Furthermore, any interval of values denoted by the expression "between a and b" represents the range of values extending from more than a to less than b (i.e. limits a and b excluded), whereas any interval of values denoted by the expression "from a to b" means the range of values extending from a up to b (i.e. including the strict limits a and b).

The compounds comprising carbon mentioned in the description may be of fossil or biobased origin. In the latter case, they may be partially or totally derived from biomass or may be obtained from renewable starting materials derived from biomass. Polymers, plasticizers, fillers, etc. are notably concerned.

Functionalized Elastomer

The term "functionalized elastomer or rubber (the two terms being, in a known manner, synonymous and interchangeable) comprising polar functional groups" means any type of elastomer within the meaning known to a person skilled in the art, whether it is a homopolymer or a block, statistical or other copolymer, having elastomeric properties, which is functionalized, i.e. it bears functional groups chosen from polar functional groups.

The rubber composition in accordance with the invention may contain only one functionalized elastomer or a mixture of several functionalized elastomers (which will then be denoted in the singular as being "the functionalized elastomer" to represent the sum of the functionalized elastomers of the composition), the functionalized elastomer possibly being used in combination with any type of non-functionalized elastomer, for example diene elastomer, or even with elastomers other than diene elastomers.

The functionalized elastomer is predominant in the rubber composition according to the invention, i.e. it is either the only elastomer or it is the one which represents the greatest mass among all the elastomers of the composition.

According to a preferential embodiment of the invention, the rubber composition comprises from more than 50 to 100 phr, preferably from 70 to 100 phr, of functionalized elastomer as a blend with 0 to 50 phr and preferably 0 to 30 phr of one or more other minority non-functionalized elastomers.

According to another preferential embodiment of the invention, the composition includes, for the whole of the 100 phr of elastomer, one or more functionalized elastomers comprising polar functional groups.

The functionalized elastomer is preferentially chosen from the group consisting of functionalized diene elastomers, functionalized olefinic elastomers and mixtures thereof.

Preferentially, the functionalized elastomer is chosen from functionalized olefinic elastomers and mixtures thereof. According to another preferential variant of the invention, the functionalized elastomer is chosen from functionalized diene elastomers and mixtures thereof.

The glass transition temperature Tg of the elastomers described in the present text is measured in a known manner by DSC (Differential Scanning Calorimetry), for example and unless specifically indicated otherwise, according to the standard ASTM D3418 of 1999.

Size exclusion chromatography or SEC is used to determine the macrostructure of the polymers. SEC makes it possible to separate macromolecules in solution according to their size through columns filled with a porous gel. The macromolecules are separated according to their hydrodynamic volume, the bulkiest being eluted first.

Without being an absolute method, SEC makes it possible to comprehend the molar mass distribution of a polymer. The various number-average molar masses (Mn) and weight-average molar masses (Mw) may be determined from commercial standards and the polydispersity index (PDI=Mw/Mn) may be calculated via a "Moore" calibration.

Preparation of the polymer: There is no specific treatment of the polymer sample before analysis. Said sample is simply dissolved in tetrahydrofuran (THF) which contains 1 vol % of diisopropylamine, 1 vol % of triethylamine and 0.1 vol % of distilled water, at a concentration of about 1 g/l. The solution is then filtered through a filter with a porosity of 0.45 μm before injection.

SEC analysis: The apparatus used is a Waters Alliance chromatograph. The elution solvent is tetrahydrofuran which contains 1 vol % of diisopropylamine and 1 vol % of triethylamine. The flow rate is 0.7 ml/min, the temperature of the system is 35° C. and the analysis time is 90 min.

A set of four Waters columns in series, having the commercial names Styragel HMW7, Styragel HMW6E and two Styragel HT6E, is used.

The volume of the solution of the polymer sample injected is 100 μl. The detector is a Waters 2410 differential refractometer and the software for processing the chromatographic data is the Waters Empower system.

The calculated average molar masses are relative to a calibration curve produced from PSS Ready Cal-Kit commercial polystyrene standards.

Diene Elastomers

It is recalled that the term "elastomer of the functionalized diene type" should be understood as meaning an elastomer which is derived at least partly (i.e., a homopolymer or a copolymer) from diene monomers (monomers bearing two conjugated or non-conjugated carbon-carbon double bonds), this polymer being functionalized, i.e. it bears functional groups chosen from polar functional groups.

A first characteristic of functionalized diene elastomers is thus that they are diene elastomers. These diene elastomers may be classified into two categories: "essentially unsaturated" or "essentially saturated". The term "essentially unsaturated" generally refers to a diene elastomer at least partly derived from conjugated diene monomers having a content of units of diene origin (conjugated dienes) which is greater than 15% (mol %); thus it is that diene elastomers such as butyl rubbers or copolymers of dienes and of α-olefins of EPDM type do not come within the preceding definition and may notably be described as "essentially saturated" diene elastomers (low or very low content, always less than 15%, of units of diene origin). The diene elastomers included in the composition according to the invention are preferentially essentially unsaturated.

The term "diene elastomer that may be used in the compositions in accordance with the invention" particularly means:
(a) any homopolymer of a conjugated or non-conjugated diene monomer containing from 4 to 18 carbon atoms;
(b) any copolymer of a conjugated or non-conjugated diene containing from 4 to 18 carbon atoms and of at least one other monomer.

The other monomer may be ethylene, an olefin or a conjugated or non-conjugated diene.

Conjugated dienes that are suitable include conjugated dienes containing from 4 to 12 carbon atoms, in particular 1,3-dienes, notably such as 1,3-butadiene and isoprene.

Olefins that are suitable include vinylaromatic compounds containing from 8 to 20 carbon atoms and aliphatic α-monoolefins containing from 3 to 12 carbon atoms.

Vinylaromatic compounds that are suitable include, for example, styrene, ortho-, meta- or para-methylstyrene, the "vinyltoluene" commercial mixture or para-(tert-butyl)styrene.

Aliphatic α-monoolefins that are suitable notably include acyclic aliphatic α-monoolefins containing from 3 to 18 carbon atoms.

The functionalized diene elastomer is preferably a diene elastomer of the highly unsaturated type, in particular a diene elastomer chosen from the group consisting of natural rubber (NR), synthetic polyisoprenes (IRs), polybutadienes (BRs), butadiene copolymers, isoprene copolymers and mixtures of these elastomers. Such copolymers are more preferentially chosen from the group consisting of butadiene/styrene copolymers (SBRs), isoprene/butadiene copolymers (BIRs), isoprene/styrene copolymers (SIRs), isoprene/butadiene/styrene copolymers (SBIRs) and mixtures of such copolymers.

The above diene elastomers may be, for example, block, random, sequential or microsequential elastomers and may be prepared in dispersion or in solution; they may be coupled and/or star-branched or else functionalized with a coupling and/or star-branching or functionalization agent.

The following are preferentially suitable: polybutadienes and in particular those having a content of 1,2-units of between 4% and 80% or those having a content of cis-1,4-units of greater than 80%, polyisoprenes, butadiene/styrene copolymers and in particular those having a styrene content of between 5% and 50% by weight and more particularly between 20% and 40%, a content of 1,2-bonds of the butadiene part of between 4% and 65% and a content of trans-1,4-bonds of between 20% and 80%, butadiene/isoprene copolymers and notably those having an isoprene content of between 5% and 90% by weight and a glass transition temperature of from −40° C. to −80° C., or isoprene/styrene copolymers and notably those having a styrene content of between 5% and 50% by weight and a Tg of between −25° C. and −50° C.

In the case of butadiene/styrene/isoprene copolymers, those having a styrene content of between 5% and 50% by weight and more particularly of between 10% and 40%, an isoprene content of between 15% and 60% by weight and more particularly between 20% and 50%, a butadiene content of between 5% and 50% by weight and more particularly of between 20% and 40%, a content of 1,2-units of the butadiene part of between 4% and 85%, a content of trans-1,4-units of the butadiene part of between 6% and 80%, a content of 1,2-plus 3,4-units of the isoprene part of between 5% and 70% and a content of trans-1,4-units of the isoprene part of between 10% and 50%, and more generally any butadiene/styrene/isoprene copolymer having a Tg of between −20° C. and 70° C., are notably suitable.

Olefinic Elastomers

It is recalled that the term "elastomer of the functionalized olefinic type" should be understood as meaning an elastomer bearing functional groups chosen from polar functional groups, and the elastomeric chain of which is a carbon chain predominantly including olefin monomer units denoted O.

The monomers O may originate from any olefin known to those skilled in the art, for instance ethylene, propylene, butylene or isobutylene, these monomers optionally being substituted with linear or branched alkyl groups.

Preferentially, O is an ethylene unit [—CH2-CH2-] and, in this preferential case, the functionalized olefinic elastomer is a functionalized ethylenic elastomer.

The molar content of O is greater than 50%. More precisely, the molar content of O is between 50% and 95%, preferentially between 65% and 85%. For the purposes of the present invention, the olefinic elastomer is thus a copolymer also including from 5 to 50 mol % of non-olefinic units, i.e. units other than O.

These non-olefinic units are composed, partly or totally, of units bearing functional groups, denoted as R, necessary for the requirements of the invention.

The content (mol %) of units R of the functionalized olefinic elastomers described previously may vary to a great extent according to the specific embodiments of the invention, preferably within a range from 0.1% to 50%, preferentially within a range from 0.3% to 50%, more preferentially within a range from 0.3% to 30% and very preferentially within a range from 2.5% to 30%. When the content of units R is less than 0.1%, there is a risk of the targeted technical effect being insufficient whereas, above 50%, the elastomer would no longer be predominantly olefinic.

In the case where not all the non-olefinic units are units R, other units, denoted A', are present in the carbon chain so that the total molar content represented by the monomers O, R and A' is equal to 100%. The non-olefinic monomers that are useful for preparing the functionalized olefinic elastomers may be chosen from non-olefinic monomers not resulting in unsaturations and monomers which, once polymerized, result in unsaturations borne by the elastomer chain (other than diene monomers).

The non-olefinic monomers not resulting in unsaturations are essentially vinyl and acrylic/methacrylic monomers. For example, such monomers may be chosen from styrene, vinyl acetate, vinyl alcohol, acrylonitrile, methyl acrylate or methyl methacrylate, these monomers optionally being substituted with alkyl or aryl groups or other functionalized groups.

For example also, the non-diene monomers that are useful for preparing the olefinic elastomers bearing unsaturations by copolymerization are all those known to a person skilled in the art for forming unsaturated elastomers, for instance dicyclopentadienyloxyethyl methacrylate.

Polar Functional Groups

In accordance with the invention, the rubber composition is based on at least one functionalized elastomer comprising polar functional groups. The presence of polar functional groups in the elastomer enables its crosslinking with the phenolic compound of general formula (I) independently of the rest of the structure of the elastomer, for example diene or olefinic, the whole also having improved adhesion properties.

For the purposes of the present invention, the term "polar functional group" means a functional group having a non-zero dipole moment, resulting from asymmetrically arranged opposite charges (i.e. having partial positive and partial negative charges). The polar bonds in the polar functional group may be, for example, bonds between carbon atoms and other atoms of relatively high electronegativity, such as O, N, F and Cl.

Preferably, the polar functional groups of the functionalized elastomer comprise at least one atom chosen from halogens, oxygen and nitrogen. Preferably, the polar functional groups of the functionalized elastomer comprise a group chosen from hydroxyl, carbonyl, imine and epoxide groups.

Hydroxyl, carbonyl, imine and epoxide groups are well known to those skilled in the art. The term "hydroxyl group" means a group of formula —OH. The term "carbonyl group" means a group comprising a carbon atom bonded via a double bond to an oxygen atom. The term "imine group" means a group comprising a carbon atom bonded via a double bond to a nitrogen atom. The term "epoxide group" means a group comprising an oxygen atom bridged across a carbon-carbon bond.

The functional groups present in the elastomer are obtained, in a manner known to those skilled in the art, by copolymerization or by post-polymerization modification, and are either borne directly by the backbone of the chain, or borne by a side group depending on the production method.

Preferably, the functionalized elastomer of the rubber composition according to the invention comprises at least one group chosen from primary aldimine, aldehyde and epoxide groups, preferentially epoxide.

The term "primary aldimine" means the monovalent group of imine type of formula —(CH)=NH. The term "aldehyde" means the monovalent group of carbonyl type of formula —(CH)=O.

Epoxide-Functionalized Elastomers

The functionalized elastomer comprising polar functional groups is preferably a functionalized elastomer comprising epoxide groups. The functionalized elastomers comprising epoxide groups, referred to without preference as "epoxidized elastomers" or "epoxide-functionalized elastomers" are, in a known manner, solid at room temperature (20° C.); the term "solid" refers to any substance not having the ability ultimately to take, at the latest after 24 hours, solely under the effect of gravity and at room temperature (20° C.), the shape of the container in which it is present.

The degree (mol %) of epoxidation of the epoxidized elastomers may vary to a large extent according to the specific embodiments of the invention, preferably within a range from 0.1% to 80%, preferentially within a range from 0.1% to 50% and more preferentially within a range from 0.3% to 50%. When the degree of epoxidation is less than 0.1%, there is a risk of the targeted technical effect being insufficient whereas, above 80%, the intrinsic properties of the polymer are degraded. For all these reasons, the degree of functionalization, notably of epoxidation, is more preferentially within a range from 0.3% to 30%, preferentially within a range from 2.5% to 30%.

The epoxidized diene elastomers may, for example, be obtained in a known manner by epoxidation of the equivalent non-epoxidized diene elastomer, for example via processes based on chlorohydrin or on bromohydrin or processes based on hydrogen peroxides, on alkyl hydroperoxides or on peracids (such as peracetic acid or performic acid); see notably Kautsch. Gummi Kunstst., 2004, 57(3), 82. The epoxide functions are then in the polymer chain. Mention may notably be made of epoxidized natural rubbers (abbreviated as ENRs); such ENRs are, for example, sold under the names ENR-25 and ENR-50 (respective degrees of epoxidation of 25% and 50%) by the company Guthrie Polymer. Epoxidized BRs are, themselves also, well known, for example sold by the company Sartomer under the name Poly Bd (for example, Poly Bd 605E). Epoxidized SBRs may be prepared by epoxidation techniques that are well known to a person skilled in the art.

Diene elastomers bearing epoxide groups have been described, for example, in US 2003/120007 or EP 0 763 564, and U.S. Pat. No. 6,903,165 or EP 1 403 287.

Preferentially, the epoxidized diene elastomer is chosen from the group consisting of epoxidized natural rubbers (NRs) (abbreviated as ENRs), epoxidized synthetic polyisoprenes (IRs), epoxidized polybutadienes (BRs) preferentially having a content of cis-1,4-bonds of greater than 90%, epoxidized butadiene/styrene copolymers (SBRs) and mixtures of these elastomers.

The epoxidized diene elastomers may also bear epoxide side functions. In this case, they may be obtained either by post-polymerization modification (see, for example, J. Appl. Polym. Sci., 1999, 73, 1733), or by radical copolymerization of the diene monomers with monomers bearing epoxide functions, notably methacrylic acid esters including epoxide functions, for instance glycidyl methacrylate (this radical polymerization, notably in bulk, in solution or in dispersed medium—notably dispersion, emulsion or suspension—is well known to a person skilled in the art of the synthesis of polymers: mention may be made, for example, of the following reference: Macromolecules 1998, 31, 2822) or by the use of nitrile oxides bearing epoxide functions. For example, US 2011/0098404 describes the emulsion copolymerization of 1,3-butadiene, styrene and glycidyl methacrylate.

Epoxidized olefinic elastomers and the processes for obtaining them are well known to a person skilled in the art. Olefinic elastomers bearing epoxide groups have been described, for example, in EP 0 247 580 and U.S. Pat. No. 5,576,080. The company Arkema commercially provides epoxidized polyethylenes under the trade names Lotader AX8840 and Lotader AX8900.

The epoxide function may be borne directly by the carbon backbone and is then mainly obtained by epoxidation of carbon-carbon double bonds initially present after copolymerization. This epoxidation of unsaturated polymers is well known to those skilled in the art and may be performed, for example, via processes based on chlorohydrin or bromohydrin, direct oxidation processes or processes based on hydrogen peroxides, on alkyl hydroperoxides or on peracids (such as peracetic acid or performic acid).

The epoxide function may also be pendent and is then either already present in a monomer involved in the copolymerization with the olefin (this monomer may, for example, be glycidyl methacrylate, allyl glycidyl ether or vinyl glycidyl ether) or obtained by the post-copolymerization modification of a pendent function.

The epoxidized olefinic elastomers have a Tg which in the vast majority of cases is negative (i.e. less than 0° C.).

The epoxidized olefinic elastomers have a number-average molar mass (Mn) of at least 10 000 g/mol, preferentially of at least 15 000 g/mol, and of not more than 1 500 000 g/mol. The polydispersity index PDI, equal to Mw/Mn (Mw being the weight-average molar mass), is between 1.05 and 11.00.

Preferably, and to sum up, the olefinic elastomer comprising epoxide functions is thus a copolymer containing at least 50% (in moles) of olefin monomer units and with a number of different monomer units of greater than or equal to 2, preferentially from 2 to 5 and more preferentially 2 or 3. This copolymer may be obtained by copolymerization or by post-polymerization modification of an elastomer. The epoxide functions present in the olefinic copolymer, obtained by copolymerization or by post-polymerization modification, will either be borne directly by the backbone of the chain or will be borne by a side group, depending on the preparation method, for example by epoxidation or any other modification of the diene functions present in the elastomeric chain after copolymerization.

Reinforcing Filler

Use may be made of any type of reinforcing filler known for its abilities to reinforce a rubber composition that may be used in the manufacture of tyres, for example an organic filler such as carbon black, a reinforcing inorganic filler such as silica, or else a blend of these two types of filler, notably a blend of carbon black and silica.

All carbon blacks, notably blacks of the HAF, ISAF or SAF type, conventionally used in tyres ("tyre-grade" blacks) are suitable as carbon blacks. Among the latter, mention will be made more particularly of the reinforcing carbon blacks of the 100, 200 or 300 series (ASTM grades), for instance the N115, N134, N234, N326, N330, N339, N347 or N375 blacks, or else, depending on the applications targeted, blacks of higher series (for example N660, N683 or N772). The carbon blacks might, for example, be already incorporated into an isoprene elastomer in the form of a masterbatch (see, for example, patent applications WO 97/36724 and WO 99/16600). The BET specific surface area of the carbon blacks is measured according to the standard D6556-10

[multipoint (a minimum of 5 points) method—gas: nitrogen—relative pressure P/P0 range: 0.1 to 0.3].

In the present patent application, the term "reinforcing inorganic filler" should be understood, by definition, as meaning any inorganic or mineral filler (regardless of its colour and its origin, natural or synthetic), also known as "white filler", "clear filler" or even "non-black filler", as opposed to carbon black, which is capable of reinforcing by itself alone, without any means other than an intermediate coupling agent, a rubber composition intended for the manufacture of tyres, in other words capable of replacing, in its reinforcing role, a conventional tyre-grade carbon black; such a filler is generally characterized, in a known manner, by the presence of hydroxyl (—OH) groups at its surface.

Mineral fillers of the siliceous type, in particular silica ($SiO_2$), or of the aluminous type, in particular alumina ($Al_2O_3$), are notably suitable as reinforcing inorganic fillers. The silica used may be any reinforcing silica known to those skilled in the art, notably any precipitated or fumed silica having a BET surface area and a CTAB specific surface area which are both less than 450 $m^2/g$, preferably from 30 to 400 $m^2/g$. As highly dispersible precipitated silicas (HDSs), mention will be made, for example, of the Ultrasil 7000 and Ultrasil 7005 silicas from the company Degussa, the Zeosil 1165MP, 1135MP and 1115MP silicas from the company Rhodia, the Hi-Sil EZ150G silica from the company PPG, the Zeopol 8715, 8745 and 8755 silicas from the company Huber or the silicas with a high specific surface area as described in patent application WO 03/16837.

The physical state in which the reinforcing inorganic filler is provided is not important, whether it be in the form of a powder, of micropearls, of granules, of beads or any other appropriate densified form. Needless to say, the term "reinforcing inorganic filler" also refers to mixtures of different reinforcing inorganic fillers, in particular of highly dispersible siliceous and/or aluminous fillers.

The reinforcing inorganic filler used, in particular if it is silica, preferably has a BET surface area of between 45 and 400 $m^2/g$, more preferentially of between 60 and 300 $m^2/g$.

Preferentially, the total content of reinforcing filler (carbon black and/or reinforcing inorganic filler such as silica) is between 20 and 200 phr, more preferentially between 30 and 150 phr, the optimum being, in a known manner, different depending on the specific applications targeted: the level of reinforcement expected with regard to a bicycle tyre, for example, is, of course, less than that required with regard to a tyre capable of running at high speed in a sustained manner, for example a motorcycle tyre, a tyre for a passenger vehicle or a tyre for a utility vehicle, such as a heavy-duty vehicle.

According to a preferential embodiment of the invention, use is made of a reinforcing filler including between 30 and 150 phr, more preferentially between 50 and 120 phr, of organic filler, particularly of carbon black, and optionally silica; the silica, when it is present, is preferably used at a content of less than 20 phr, more preferentially of less than 10 phr (for example between 0.1 and 10 phr). This preferential embodiment is particularly preferred when the predominant elastomer of the composition is an epoxidized isoprene rubber, more particularly epoxidized natural rubber.

Alternatively, according to another preferential embodiment of the invention, use is made of a reinforcing filler including between 30 and 150 phr, more preferentially between 50 and 120 phr, of inorganic filler, particularly of silica, and optionally carbon black; the carbon black, when it is present, is preferably used at a content of less than 20 phr, more preferentially of less than 10 phr (for example between 0.1 and 10 phr). This preferential embodiment is also particularly preferred when the predominant elastomer of the composition is an epoxidized isoprene rubber, more particularly epoxidized natural rubber.

Preferably, the rubber composition according to the invention is free of coupling agent (or bonding agent). The term "composition free of a compound" means that the composition does not comprise this compound deliberately introduced into the composition and that this compound, if it is present, is present in the form of traces related, for example, to the process for the manufacture of the composition or of the elements of which it is composed. For example, the composition free of this compound comprises an amount of less than or equal to 0.2 phr, preferably of less than or equal to 0.1 phr and preferably of less than or equal to 0.05 phr of this compound.

A person skilled in the art will understand that use may be made, as filler equivalent to the reinforcing inorganic filler described in the present section, of a reinforcing filler of another nature, notably of organic nature, provided that this reinforcing filler is covered with an inorganic layer such as silica, or else includes, on its surface, functional sites, notably hydroxyl sites, making it possible to establish the bonding between the filler and the elastomer in the presence or absence of a covering or coupling agent.

Phenolic Compound

The composition according to the invention comprises at least one phenolic compound of general formula (I)

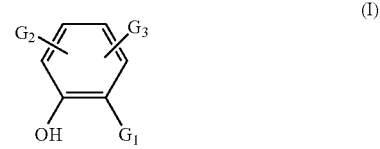

in which:
G$_1$ represents a hydroxyl, carboxyl or alkoxy group or a hydrogen atom;
G$_2$ represents a hydroxyl group or a hydrogen atom;
G$_3$ represents a hydrogen atom or a group from among: hydroxyl, carboxyl, hydrogenocarbonyl, alkyl, carboxylalkyl, carboxylalkenyl, carbonylalkyl, aryl, aryloxy, arylthioxy, arylcarbonyl, amino, aminoalkyl;
at least one of the substituents G$_1$ to G$_3$ comprises an oxygen atom.

In the present description, the term "phenolic compound" denotes the aromatic compound of general formula (I).

The term "carboxyl group" or "carboxylic acid function" means a group of formula —COOH in which the carbon atom is linked via a double bond to an oxygen atom and via a single bond to a hydroxyl group —OH.

The term "hydrogenocarbonyl group" means a group of formula —CHO in which the carbon atom is linked via a double bond to an oxygen atom and via a single bond to a hydrogen atom.

The term "carboxyalkenyl group" means a group of formula (CnH2n-2)—COOH. The term "carbonylalkyl group" means a group of formula —(CnH2n)—CHO.

The term "aryloxy group" means a group of general formula —O-Aryl, in which an aryl group is linked to an oxygen atom. The term "arylthioxy group" means a group of general formula —S-Aryl, in which an aryl group is linked to a sulfur atom. The term "arylcarbonyl group" means a group of general formula —CO-Aryl, in which an aryl group is linked to a carbonyl group.

The term "amino group" means a group of formula —$NH_2$.

The term "aminoalkyl radical" means a radical of formula —$C_nH_{2n}$—$NH_2$.

In the preceding definitions, n is an integer advantageously between 1 and 15, preferentially between 1 and 10, very preferentially between 1 and 5 and preferably between 1 and 3.

Preferably, $G_3$ represents a hydrogen atom or a group chosen from the following groups: hydroxyl, carboxyl, carboxylalkyl, aryl, aryloxy, arylthioxy, arylcarbonyl.

Preferably, the phenolic compound of general formula (I) comprises at least one aromatic nucleus bearing at least two hydroxyl functions in the meta position relative to each other, the two positions ortho to at least one of the hydroxyl functions being unsubstituted.

Preferentially, the phenolic compound of general formula (I) bears at least three hydroxyl functions preferably in the meta position relative to each other, the two positions ortho to each hydroxyl function preferentially being unsubstituted.

In a preferred arrangement, $G_3$ represents a group chosen from the following groups: aryl, aryloxy, arylthioxy, arylcarbonyl. Preferably, according to this arrangement, at least two aromatic nuclei of the phenolic compound of general formula (I) bear at least two hydroxyl functions in the meta position relative to each other, the two positions ortho to at least one of the hydroxyl functions of at least one aromatic nucleus, and preferably of each aromatic nucleus, being unsubstituted.

Very preferably, the phenolic compound of general formula (I) is chosen from the group consisting of resorcinol, phloroglucinol, 2,2',4,4'-tetrahydroxydiphenyl sulfide, 2,2',4,4'-tetrahydroxybenzophenone and mixtures of these compounds.

The rubber composition according to the invention advantageously comprises from 0.1 to 60 phr, preferably from 0.1 to 50 phr, preferably from 0.1 to 30 phr, very preferably from 2 to phr and very preferably from 4 to 30 phr of phenolic compound. Below 0.1 phr, the phenolic compound has no notable effect on the crosslinking of the rubber composition according to the invention. The exact content is adjusted by a person skilled in the art as a function of the properties desired for the crosslinked rubber composition, in particular its stiffness and its hysteresis losses.

Surprisingly, the presence of at least one compound of general formula (I) enables the crosslinking of the rubber composition according to the invention.

Surprisingly also, very good adhesion of the composition according to the invention to reinforcing cords is obtained, in particular when several phenolic compounds of general formula (I) are used. Thus, preferably, the composition according to the invention comprises at least two phenolic compounds of general formula (I), at least one of the two phenolic compounds preferentially comprising at least two hydroxyl functions.

Aldehyde

Preferably, the composition according to the invention may also comprise an aldehyde compound as defined in patent applications WO 2016/116468, WO 2017/103403, WO 2017/103404 and WO 2017/103406 (compounds denoted, respectively, in these patent applications as aldehyde of formula (A), compound of formula W5, aldehyde of formula W and compound of formula W2).

Very preferably, the composition according to the invention may comprise an aldehyde chosen from the group consisting of 1,3-benzenedicarboxaldehyde, 1,4-benzenedicarboxaldehyde and a mixture thereof, preferentially 1,4-benzenedicarboxaldehyde.

Addition of this compound makes it possible to modify the stiffness of the composition according to the invention once it is crosslinked, without penalizing the hysteresis properties.

Various Additives

The rubber compositions in accordance with the invention may also include all or some of the usual additives known to a person skilled in the art and usually used in rubber compositions for tyres, in particular compositions of internal layers, as defined subsequently in the present patent application, for instance plasticizers (plasticizing oils and/or plasticizing resins), reinforcing or non-reinforcing fillers other than those mentioned previously, pigments, protective agents, such as antiozone waxes, chemical antiozonants, antioxidants, anti-fatigue agents or reinforcing resins (such as described, for example, in patent application WO 02/10269).

These compositions may also contain processing aids that are capable, in a known manner, by virtue of an improvement in the dispersion of the filler in the rubber matrix and of a lowering of the viscosity of the compositions, of improving their ability to be processed in the raw state, these agents being, for example, hydrolysable silanes, such as alkylalkoxysilanes (for example octyltriethoxysilane or silane octeo), polyols, polyethers, primary, secondary or tertiary amines, or hydroxylated or hydrolysable polyorganosiloxanes.

Surprisingly, the compound of general formula (I) enables the crosslinking of the rubber composition according to the invention. That is to say that it makes it possible, by curing, to increase the stiffness of the composition and to increase its elasticity.

Thus, the rubber composition according to the invention is free of a crosslinking system usually associated with functionalized elastomers comprising polar functional groups. In particular, it does not simultaneously comprise an alkyl-imidazole and a polycarboxylic acid of general formula (P1):

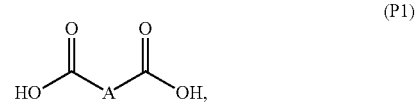

(P1)

A representing a covalent bond or a hydrocarbon-based group including at least 1 carbon atom and preferentially from 1 to 1800 carbon atoms, which is optionally substituted and optionally interrupted with one or more heteroatoms, Preferably, the rubber composition according to the invention comprises less than 20 phr, preferentially less than 10 phr, very preferentially less than 2 phr and very preferably does not comprise any polycarboxylic acid of general formula (P1). Preferably, the rubber composition according to the invention comprises less than 2 phr, preferentially less than 1 phr, very preferentially less than 0.2 phr and very preferably does not comprise any alkyl-imidazole.

Preferably, the rubber composition according to the invention is free of a vulcanization system or contains less than 1 phr, preferably less than 0.5 phr and more preferentially less than 0.2 phr thereof. Thus, the rubber composition according to the invention is preferentially free of molecular sulfur or contains less than 1 phr, preferably less than 0.5 phr and more preferentially less than 0.2 phr thereof. Similarly, the composition is preferentially free of any vulcanization accelerator or activator as known to those skilled in the art or contains less than 1 phr, preferably less than 0.5 phr and more preferentially less than 0.2 phr thereof. In particular, the rubber composition according to the invention is preferentially free of zinc or zinc oxide or contains less than 1 phr, preferably less than 0.5 phr and very preferably less than 0.2 phr thereof.

Similarly, the rubber composition according to the invention is preferentially free of cobalt salts, as known to a person skilled in the art, and the effect of which known to a person skilled in the art is an improvement in the adhesion, or contains less than 1 phr, preferably less than 0.5 phr, more preferentially less than 0.2 phr and very preferentially less than 0.1 phr thereof.

Thus, surprisingly, very good adhesion of the composition according to the invention to reinforcing cords is obtained without it being necessary to use cobalt salts.

Preparation of the Rubber Compositions

The rubber composition in accordance with the invention may be manufactured in appropriate mixers using two successive preparation phases well known to those skilled in the art:
- a first phase of thermomechanical working or kneading, which may be performed in a single thermomechanical step during which all the necessary constituents, notably the elastomeric matrix, the fillers and the optional various other additives, are introduced into an appropriate mixer, such as a standard internal mixer (for example of "Banbury" type). The incorporation of the filler into the elastomer may be performed in one or more portions while thermomechanically kneading. In the case where the filler is already incorporated, totally or partly, into the elastomer in the form of a masterbatch, as is described, for example, in patent applications WO 97/36724 and WO 99/16600, it is the masterbatch which is directly kneaded and, where appropriate, the other elastomers or fillers present in the composition which are not in masterbatch form, and also the optional various other additives, are incorporated.

The first phase is performed at high temperature, up to a maximum temperature of between 110° C. and 190° C., preferably between 130° C. and 180° C., for a period of time generally of between 2 and 10 minutes.
- a second phase of mechanical working, which is performed in an external mixer, such as an open mill, after cooling the mixture obtained during the first phase down to a lower temperature, typically below 110° C., for example between 40° C. and 100° C. The phenolic compound(s) are then incorporated and the whole is then mixed for a few minutes, for example between 2 and 15 min.

The final composition thus obtained may subsequently be calendered, for example in the form of a sheet or a plaque, notably for laboratory characterization, or may be extruded in the form of a rubber semi-finished product (or profiled element) used in the manufacture of a tyre.

The composition may be either in the raw state (before crosslinking) or in the cured state (after crosslinking), or may be a semi-finished product which can be used in a tyre.

Composite

The invention also relates to a composite based at least on a reinforcing element and on a rubber composition according to the invention.

The expression composite "based at least on a reinforcing element and on a composition according to the invention" should be understood as meaning a composite comprising the reinforcing element and said composition, it having been possible for the composition to react with the surface of the reinforcing element during the various phases of manufacture of the composite, in particular during the crosslinking of the composition or during the manufacture of the composite before crosslinking of the composition.

Said reinforcing element is a threadlike element. It may be totally or partly metallic or textile. The term "threadlike element" refers to an element having a length at least 10 times greater than the greatest dimension of its cross section, irrespective of the shape of said cross section: circular, elliptical, oblong, polygonal, notably rectangular or square or oval. In the case of a rectangular cross section, the threadlike element has the shape of a band.

In particular, said reinforcing element may be of textile nature, i.e. made of an organic material, notably a polymeric material, or an inorganic material, for instance glass, quartz, basalt or carbon. The polymeric materials may be of the thermoplastic type, for instance aliphatic polyamides, notably polyamides 6,6, and polyesters, notably polyethylene terephthalate. The polymeric materials may be of the non-thermoplastic type, for instance aromatic polyamides, notably aramid, and cellulose, either natural or artificial, notably rayon.

In a particular arrangement, said reinforcing element comprises a metallic surface.

The metallic surface of the reinforcing element constitutes at least a part and preferentially all the surface of said element and is intended to come directly into contact with the composition according to the invention. Preferably, the reinforcing element is metallic, i.e. it is formed of a metallic material.

The composition according to the invention coats at least a part of the reinforcing element, preferentially all of said element.

According to a first variant of the invention, the metallic surface of the reinforcing element is made of a different material from the remainder of the reinforcing element. In other words, the reinforcing element is made of a material which is at least partly, preferentially totally, covered with a metallic layer which constitutes the metallic surface. The material at least partly, preferentially totally, covered with the metallic surface is metallic or non-metallic, preferably metallic, in nature.

According to a second variant of the invention, the reinforcing element is made of one and the same material, in which case the reinforcing element is made of a metal which is identical to the metal of the metallic surface.

According to one embodiment of the invention, the metallic surface comprises a metal chosen from the group consisting of iron, copper, zinc, tin, aluminium, cobalt, nickel and alloys including at least one of these metals. The alloys may be, for example, binary or ternary alloys, such as steel, bronze and brass. Preferably, the metallic surface comprises a metal chosen from the group consisting of iron, copper, tin, zinc and an alloy including at least one of these metals. More preferentially, the metallic surface comprises a metal chosen from the group consisting of steel, brass (Cu—Zn alloy), zinc and bronze (Cu—Sn alloy), and even more preferably from the group consisting of brass and steel. Very preferably, the metallic surface is made of brass.

As certain metals are subject to oxidation on contact with ambient air, the metal may be partly oxidized.

When the metallic surface is made of steel, the steel is preferentially a carbon steel or a stainless steel. When the steel is a carbon steel, its carbon content is preferably between 0.01% and 1.2% or between 0.05% and 1.2%, or else between 0.2% and 1.2%, notably between 0.4% and 1.1%. When the steel is stainless steel, it preferably includes at least 11% of chromium and at least 50% of iron.

According to a preferred embodiment, the composite is a reinforced product which comprises several reinforcing elements as defined above and a calendering rubber in which the reinforcing elements are embedded, the calendering rubber consisting of the rubber composition according to the invention. According to this embodiment, the reinforcing elements are generally arranged side by side along a main direction. For an application envisaged in tyres, the composite may thus constitute a tyre reinforcement.

The composite in accordance with the invention may be in the raw state (before crosslinking of the rubber composition) or in the cured state (after crosslinking of the rubber composition). The composite is cured after bringing the reinforcing element(s) into contact with the rubber composition according to the invention.

The composite may be manufactured via a process which comprises the following steps:
  making two layers of the composition according to the invention,
  sandwiching the reinforcing element(s) in the two layers by depositing it (them) between the two layers,
  where appropriate, curing the composite.

Alternatively, the composite may be manufactured by depositing the reinforcing element on a portion of a layer, the layer is then folded over on itself to cover the reinforcing element, which is thus sandwiched over its entire length or a part of its length.

The layers may be produced by calendering. During the curing of the composite, the rubber composition is crosslinked.

When the composite is intended to be used as a reinforcement in a tyre, the curing of the composite generally takes place during the curing of the tyre casing.

Finished or Semi-Finished Article and Tyre

A subject of the invention is also a finished or semi-finished article comprising a composition according to the invention. The finished or semi-finished article may be any article comprising a rubber composition. Examples that may be mentioned, in a non-limiting manner, include balloons, conveyor belts, shoe soles, and pneumatic or non-pneumatic tyre casings.

The tyre, which is another subject of the invention, has the essential feature of comprising the composition or the composite in accordance with the invention. The tyre may be in the raw state (before crosslinking of the rubber composition) or in the cured state (after crosslinking of the rubber composition). Generally, during the manufacture of the tyre, the composition or the composite is deposited in the raw state (i.e. before crosslinking of the rubber composition) in the structure of the tyre before the step of curing the tyre.

The invention relates in particular to tyres intended to equip motor vehicles of passenger vehicle type, SUVs (sport utility vehicles), or two-wheel vehicles (notably motor-cycles), or aircraft, or else industrial vehicles chosen from vans, heavy-duty vehicles, i.e. underground trains, buses, heavy road transport vehicles (lorries, tractors, trailers) or off-road vehicles, such as heavy agricultural vehicles or construction vehicles, and the like.

It is possible to define, within the tyre, three types of regions:
  the radially exterior region in contact with the ambient air, this region essentially consisting of the tread and of the outer sidewall of the tyre. An outer sidewall is an elastomeric layer positioned outside the carcass reinforcement relative to the internal cavity of the tyre, between the crown and the bead, so as to totally or partially cover the region of the carcass reinforcement extending from the crown to the bead.
  the radially interior region in contact with the inflation gas, this region generally consisting of the layer that is leaktight to the inflation gases, sometimes known as the leaktight interior layer or inner liner.
  the internal region of the tyre, that is to say the region between the exterior and interior regions. This region includes layers or plies which are referred to here as internal layers of the tyre. These are, for example, carcass plies, tread sublayers, tyre belt plies or any other layer which is not in contact with the ambient air or the inflation gas of the tyre.

The composition defined in the present description is particularly well suited to the internal layers of tyres.

Thus, the invention also relates to a tyre comprising an internal layer including a composition or a composite according to the present invention. According to the invention, the internal layer may be chosen from the group consisting of carcass plies, crown plies, bead-wire fillings, crown feet, decoupling layers, the tread underlayer and combinations of these internal layers. Preferably, the internal layer is chosen from the group consisting of carcass plies, crown plies, bead-wire fillings, crown feet, decoupling layers and combinations of these internal layers.

Examples

Measurement Methods
Tensile Tests

The tests were performed in accordance with the French standard NF T 46-002 of September 1988. All the tensile measurements were performed under standard conditions of temperature (23±2° C.) and hygrometry (50%±5% relative humidity), according to the French standard NF T 40-101 (December 1979).

At second elongation (that is to say after accommodation), the nominal secant modulus, calculated with respect to the initial cross section of the test specimen (or apparent stress, in MPa) is measured at 10% and 100% elongation, denoted $MA_{10}$ and $MA_{100}$, respectively. All these measurements are taken on cured (or crosslinked) test specimens.

The results are expressed in base 100, the value 100 being assigned to the control. A result of greater than 100 indicates that the composition of the example under consideration has a greater stiffness than that of the control.

Evaluation of the Rolling Resistance

The rolling resistance induced by the test composition is estimated by measuring the energy losses by measurement, at a temperature of 60° C., of the energy restored at the sixth rebound of a sample on which an initial energy has been imposed, as described in the standard DIN 53-512 of April 2000. This measurement is denoted P60 and is calculated as follows: $P60(\%)=100\times(E0-E1)/E0$, where E0 represents the initial energy and E1 the restored energy. The lower this value, the less the test sample displays hysteresis losses. The results are expressed in base 100 relative to the control, a value of less than 100 corresponding to a lower energy loss.

Preparation of the Rubber Compositions

The following procedure is used to prepare the different rubber compositions: the functionalized polymer and then all the other constituents of the mixture besides the phenolic compound(s) are successively introduced into an internal mixer (final degree of filling: approximately 70% by volume), the initial vessel temperature of which is approximately 60° C. Thermomechanical working is then performed in one step until a maximum "dropping" temperature of 150° C. is reached. The mixture thus obtained is recovered, the phenolic compound(s) are incorporated and the whole is cooled on an external mixer (homofinisher) at 30° C., while mixing.

The compositions prepared are presented in Table 1.

Preparation of the Test Specimens

The rubber compositions thus prepared are used to make a composite in the form of a test specimen, according to the following protocol: A block of rubber is prepared, consisting of two plaques applied to each other before curing.

The two plaques of the block consist of the same rubber composition. During the preparation of the block, metallic reinforcers are trapped between the two plaques in the raw state, an equal distance apart and while leaving to protrude, on either side of these plaques, an end of the metallic reinforcer having a length sufficient for the subsequent tensile test. The block including the metallic reinforcers is then placed in a mould adapted to the targeted test conditions and left to the discretion of a person skilled in the art; by way of example, in the present case, the block is cured at 170° C. for a time ranging from 50 min to 100 min according to the composition under a pressure of 5.5 tonnes.

Each metallic reinforcer consists of two wires made of steel containing 0.7% carbon, 30/100 mm in diameter, twisted together, and the brass coating comprises 63% copper.

Adhesion Test

On conclusion of the curing, the test specimen thus formed of the crosslinked block and of the metallic reinforcers is placed in the jaws of a tensile testing machine adapted to make it possible to test each section in isolation, at a given speed and a given temperature according to the method described in the standard ASTM D 2229-02 (for example, in the present case, at 100 mm/min and ambient temperature).

The adhesion levels are characterized by measuring the "stripping" force for stripping the sections out of the test specimen.

The results are expressed in base 100 relative to a control test specimen which contains metallic reinforcers of identical nature to that of the test specimen tested and which contains the rubber composition "Ti" presented in Table 1.

A value greater than that for the control test specimen, arbitrarily set at 100, indicates an improved result, i.e. a greater stripping force than that for the control test specimen.

The test specimen T0 does not comprise any crosslinking system or any phenolic compound. No crosslinking is observed and, consequently, none of the properties on the cured test specimen are measurable. The test specimen Ti comprises a standard crosslinking system for an epoxidized natural rubber composition.

It is found that the compositions according to the invention have stiffness and hysteresis loss properties in the cured state showing that they have been crosslinked. Compositions C2, C5 and C6 on which the adhesion tests were performed also show good adhesion properties.

TABLE 1

|  | T0 | T1 | C1 | C2 | C3 | C4 | C5 | C6 |
| --- | --- | --- | --- | --- | --- | --- | --- | --- |
| ENR (1) | 100 | 100 | 100 | 100 | 100 | 100 | 100 | 100 |
| Carbon black (2) | 50 | 50 | 50 | 50 | 50 | 50 | 50 | 50 |
| 6PPD (3) | 1.5 | 1.5 | 1.5 | 1.5 | 1.5 | 1.5 | 1.5 | 1.5 |
| Phloroglucinol (4) | 0 | 0 | 2 | 5 | 11 | 5 | 5 | 5 |
| (3,4-Dihydroxyphenyl) propanoic acid (4) | 0 | 0 | 0 | 0 | 0 | 5 | 0 | 0 |
| (3,4-Dihydroxyphenyl) propanoic acid (4) | 0 | 0 | 0 | 0 | 0 | 0 | 5 | 0 |
| Terephthalaldehyde (4) | 0 | 0 | 0 | 0 | 0 | 0 | 0 | 5 |
| Dodecanedioic acid (4) | 0 | 1.5 | 0 | 0 | 0 | 0 | 0 | 0 |
| Imidazole BMI (5) | 0 | 2.2 | 0 | 0 | 0 | 0 | 0 | 0 |
| Measurement results | | | | | | | | |
| $MA_{10}$ | — | 100 | 94 | 128 | 163 | 172 | 206 | 231 |
| $MA_{100}$ | — | 100 | 71 | 121 | 171 | 257 | 207 | 343 |
| P60 | — | 100 | n.m. | 129 | 105 | 75 | 104 | 96 |
| Maximum stripping force | — | 100 | n.m. | 188 | n.m. | n.m. | 344 | 396 |

All the compositions are given in phr;

—: not measurable;

n.m.: not measured (1) Epoxidized Natural Rubber, ENR-25 from the company Guthrie Polymer (2) N326

(3) N-(1,3-Dimethylbutyl)-N-phenyl-para-phenylenediamine (Santoflex 6-PPD from the company Flexsys)

(4) Supplied by Sigma-Aldrich (5) 1-Benzyl-2-methylimidazole, CAS = 13750-62-4, Sigma-Aldrich

The invention claimed is:
1. A rubber composition based on at least one functionalized elastomer comprising polar functional groups, a reinforcing filler and 2-30 phr of a phenolic compound of general formula (I)

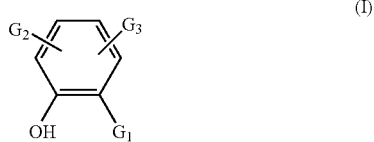

in which:
- G₁ is a hydroxyl, carboxyl or alkoxy group or a hydrogen atom;
- G₂ is a hydroxyl group or a hydrogen atom;
- G₃ is a hydrogen atom or a group selected from the group consisting of hydroxyl, carboxyl, hydrogenocarbonyl, alkyl, carboxylalkyl, carboxylalkenyl, carbonylalkyl, aryl, aryloxy, arylthioxy, arylcarbonyl, amino, and aminoalkyl; and
- at least one of the substituents G₁ to G₃ comprises an oxygen atom,
wherein the polar functional groups of the at least one functionalized elastomer comprise at least one group selected from the group consisting of hydroxyl, carbonyl, imine and epoxide groups,
wherein the rubber composition does not comprise molecular sulfur,
wherein the rubber composition does not comprise zinc oxide, and
wherein the rubber composition does not simultaneously comprise an alkyl-imidazole and a polycarboxylic acid of general formula (P1):

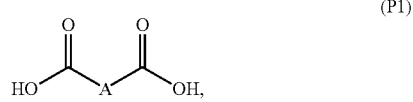

in which A is a covalent bond or a hydrocarbon-based group including at least 1 carbon atom, which is optionally substituted and optionally interrupted with one or more heteroatoms.

2. The rubber composition according to claim 1, wherein G₃ is a hydrogen atom or a group selected from the group consisting of hydroxyl, carboxyl, carboxylalkyl, aryl, aryloxy, arylthioxy, and arylcarbonyl.

3. The rubber composition according to claim 1, wherein the phenolic compound of general formula (I) comprises at least one aromatic nucleus bearing at least two hydroxyl functions in the meta position relative to each other, the two positions ortho to at least one of the hydroxyl functions being unsubstituted.

4. The rubber composition according to claim 1, wherein the phenolic compound of general formula (I) bears at least three hydroxyl functions.

5. The rubber composition according to claim 4, wherein two positions ortho to hydroxyl functions of the phenolic compound of general formula (I) are unsubstituted.

6. The rubber composition according to claim 1, wherein G₃ is a group selected from the group consisting of aryl, aryloxy, arylthioxy, and arylcarbonyl.

7. The rubber composition according to claim 6, wherein at least two aromatic nuclei of the phenolic compound of general formula (I) bear at least two hydroxyl functions in the meta position relative to each other, the two positions ortho to at least one of the hydroxyl functions of at least one aromatic nucleus being unsubstituted.

8. The rubber composition according to claim 7, wherein the two positions ortho to at least one hydroxyl function of each aromatic nucleus of the phenolic compound of general formula (I) are unsubstituted.

9. The rubber composition according to claim 1, wherein the phenolic compound of general formula (I) is selected from the group consisting of resorcinol, phloroglucinol, 2,2',4,4'-tetrahydroxydiphenyl sulfide, 2,2',4,4'-tetrahydroxybenzophenone and mixtures thereof.

10. A composite based on at least one reinforcing element and on the rubber composition according to claim 1.

11. The composite according to claim 10, wherein the reinforcing element comprises a metallic surface.

12. A finished or semi-finished article comprising the rubber composition according to claim 1.

13. A finished or semi-finished article comprising the composite according to claim 10.

14. A tire comprising the rubber composition according to claim 1.

15. A tire comprising the composite according to claim 10.

* * * * *